(12) United States Patent
Fan et al.

(10) Patent No.: US 12,718,521 B2
(45) Date of Patent: Aug. 25, 2026

(54) FACE VIDEO GENERATION METHOD, DEVICE AND ELECTRONIC EQUIPMENT

(71) Applicant: BEIJING BAIDU NETCOM SCIENCE TECHNOLOGY CO., LTD., Beijing (CN)

(72) Inventors: Xirui Fan, Beijing (CN); Yafei Zhao, Beijing (CN); Yi Chen, Beijing (CN); Zongcai Du, Beijing (CN); Zhiqiang Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 178 days.

(21) Appl. No.: 18/747,188

(22) Filed: Jun. 18, 2024

(65) Prior Publication Data

US 2024/0420403 A1 Dec. 19, 2024

(30) Foreign Application Priority Data

Feb. 1, 2024 (CN) ........................ 202410147213.0

(51) Int. Cl.
*G06T 13/40* (2011.01)
*G06T 11/60* (2026.01)
(Continued)

(52) U.S. Cl.
CPC .............. *G06T 13/40* (2013.01); *G06T 11/60* (2013.01); *G06V 10/761* (2022.01); *G06V 40/168* (2022.01)

(58) Field of Classification Search
CPC ...................................................... G06T 13/40
See application file for complete search history.

(56) References Cited

U.S. PATENT DOCUMENTS

2014/0210831 A1 7/2014 Stenger et al.
2024/0005466 A1* 1/2024 He ........................... G06T 5/50
(Continued)

FOREIGN PATENT DOCUMENTS

JP 2023011742 A 1/2023

OTHER PUBLICATIONS

Zhang, C. et al. “Dream-talk: Diffusion-based realistic emotional audio-driven method for single image talking face generation” arXiv preprint arXiv:2312.13578(Dec. 21, 2023.) (10 pages).
(Continued)

*Primary Examiner* — Shivang I Patel
(74) *Attorney, Agent, or Firm* — Osha Bergman Watanabe & Burton LLP

(57) ABSTRACT

A method for generating a human face video, an apparatus for generating a human face video, includes: obtaining a mouth-shape multimedia resource and a reference human face image of a target object; obtaining a reference style vector of the target object; for each resource frame in the mouth-shape multimedia resource, obtaining a mouth-shape driving feature by performing a feature extraction process on the resource frame; generating a stylistic human face image corresponding to the resource frame according to the mouth-shape driving feature, the reference human face image, and the reference style vector; and determining a stylistic human face video of the target object.

16 Claims, 5 Drawing Sheets

(51) Int. Cl.

*G06V 10/74* (2022.01)
*G06V 40/16* (2022.01)

(56) References Cited

U.S. PATENT DOCUMENTS

2025/0014253 A1 * 1/2025 Bharaj .................... G10L 21/10
2025/0061634 A1 * 2/2025 Huang .................... G06T 13/40

OTHER PUBLICATIONS

Office Action issued in corresponding KR Application No. 10-2024-0093106 dated Dec. 29, 2025 (22 pages).
Xia, Y. et al. "GMTalker: Gaussian mixture-based audio-driven emotional talking video portraits." arXiv preprint arXiv:2312.07669(Dec. 12, 2023.) (14 pages).

* cited by examiner

FACE VIDEO GENERATION METHOD, DEVICE AND ELECTRONIC EQUIPMENT

CROSS-REFERENCE TO RELATED APPLICATIONS

This application claims priority and benefits to Chinese Application No. 2024101472130, filed on Feb. 1, 2022, the entire content of which is incorporated herein by reference.

TECHNICAL FIELD

The disclosure relates to the technical field of artificial intelligence, in particular to technical fields of deep learning, big data, computer vision, and speech technology, etc., and provides a method for generating a human face video, an apparatus for generating a human face video, and an electronic device.

BACKGROUND

The current human face and mouth shape driving solution mainly includes: obtaining a human face and mouth shape driver model; obtaining a human face image of a target object, and an audio or a video; and inputting the human face image of the target object and the audio or the video into the human face and mouth shape driver model, and obtaining a human face video of the target object output by the human face and mouth shape driver model.

In the above-described solution, the human face and mouth shape driver model is a general-purpose human face and mouth shape driver model.

SUMMARY

According to a first aspect of the disclosure, a method for generating a human face video is provided. The method includes: obtaining a mouth-shape multimedia resource and a reference human face image of a target object; obtaining a reference style vector of the target object; for each resource frame in the mouth-shape multimedia resource, obtaining a respective mouth-shape driving feature by performing a feature extraction process on each resource frame; generating a respective stylistic human face image corresponding to the resource frame based on the respective mouth-shape driving feature, the reference human face image, and the reference style vector; and determining a stylistic human face video of the target object based on the respective stylistic human face image corresponding to each resource frame in the mouth-shape multimedia resource.

According to a second aspect of the disclosure, a method for training a human face and mouth shape driver model is provided. The method includes: obtaining a pre-trained human face and mouth shape driver model and an encoding network, the human face and mouth shape driver model including a feature extraction network and a human face driving network that are sequentially connected; obtaining a respective mouth-shape driving feature sample of each resource frame sample in a mouth-shape multimedia resource sample, a reference human face image sample, and a stylistic human face video sample, in which each resource frame sample in the mouth-shape multimedia resource sample corresponds one-to-one with each video frame sample in the stylistic human face video sample; for each resource frame sample in the mouth-shape multimedia resource sample, obtaining a style prediction vector outputted by the encoding network by inputting the mouth-shape driving feature sample and the video frame sample corresponding to the resource frame sample into an initial encoding network; obtaining a stylistic human face prediction image outputted by the human face driving network by inputting the style prediction vector, the mouth-shape driving feature sample and the reference human face image sample into the human face driving network; and obtaining a trained human face and mouth shape driver model by adjusting parameters of the encoding network and the human face driving network in the human face and mouth shape driver model based on a distribution to which the style prediction vector belongs, a Gaussian distribution, the stylistic human face prediction image and the video frame sample corresponding to the resource frame sample.

According to a third aspect of the disclosure, an electronic device is provided. The electronic device includes: at least one processor and a memory communicatively coupled to the at least one processor. The memory stores instructions executable by the at least one processor. When the instructions are executed by the at least one processor, the at least one processor is caused to obtain a mouth-shape multimedia resource and a reference human face image of a target object; obtain a reference style vector of the target object; for each resource frame in the mouth-shape multimedia resource, obtain a respective mouth-shape driving feature by performing a feature extraction process on each resource frame; generate a respective stylistic human face image corresponding to the resource frame based on the respective mouth-shape driving feature, the reference human face image, and the reference style vector; and determine a stylistic human face video of the target object based on the respective stylistic human face image corresponding to each resource frame in the mouth-shape multimedia resource.

BRIEF DESCRIPTION OF THE DRAWINGS

The accompanying drawings are used to better understand this solution and do not constitute a limitation to the disclosure, in which.

DETAILED DESCRIPTION

The following description of embodiments of the disclosure is provided in combination with the accompanying drawings, which includes various details of embodiments of the disclosure to aid in understanding, and should be considered merely exemplary. Those skilled in the art could understand that various changes and modifications of embodiments described herein may be made without departing from the scope and spirit of the disclosure. For the sake of clarity and brevity, descriptions of well-known functions and structures are omitted from the following description.

The current human face and mouth shape driving solution mainly includes: obtaining a human face and mouth shape driver model; obtaining a human face image of a target object, and an audio or a video; and inputting the human face image of the target object and the audio or the video into the human face and mouth shape driver model, and obtaining a human face video of the target object output by the human face and mouth shape driver model.

In the above-described solution, the human face and mouth shape driver model is a general-purpose human face and mouth shape driver model. The output human face video is a human face video, in the generic style, of the target object, which may hardly reflect the personal mouth shape style of each target object, resulting in a low accuracy of the generated human face video.

The current human face and mouth shape driving solution mainly includes: obtaining a human face and mouth shape driver model; obtaining a human face image of a target object, and an audio or a video; and inputting the human face image of the target object and the audio or the video into the human face and mouth shape driver model, and obtaining a human face video of the target object output by the human face and mouth shape driver model.

In the above-described solution, the human face and mouth shape driver model is a general-purpose human face and mouth shape driver model. The output human face video is a human face video, in the generic style, of the target object, which may hardly reflect the personal mouth shape style of each target object, resulting in a low accuracy of the generated human face video.

In view of the above problem, the disclosure provides a method for generating a human face video, an apparatus for generating a human face video, and an electronic device.

Figure 1:
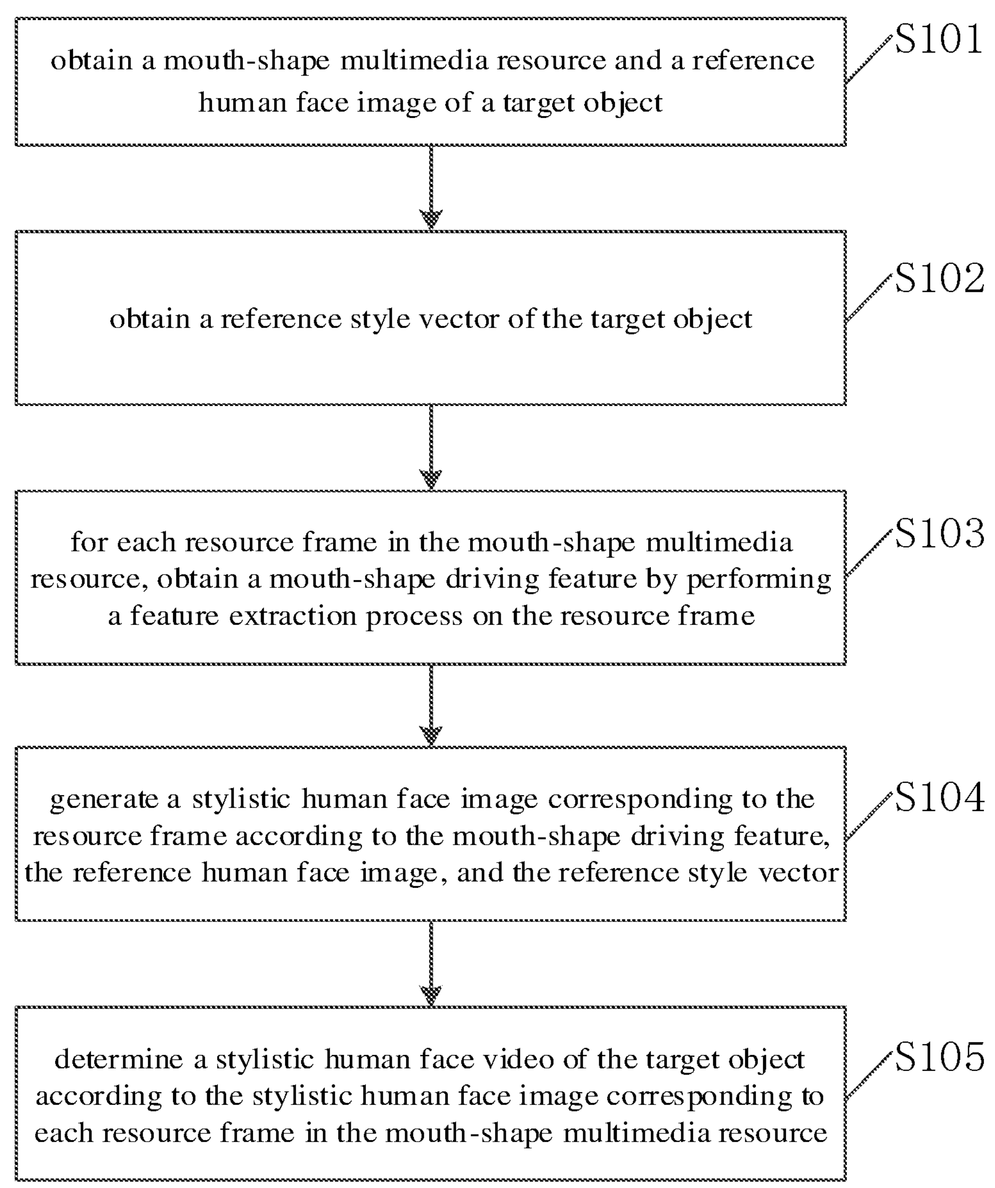
FIG. 1 is a schematic diagram according to a first embodiment of the disclosure.

FIG. 1 is a schematic diagram according to a first embodiment of the disclosure. It is noteworthy that the method for generating a human face video according to embodiments of the disclosure may be performed by an apparatus for generating a human face video. The apparatus may be provided in an electronic device, to cause the electronic device to perform a function of generating a human face video.

The electronic device may be any device having the computing capability, such as a personal computer (PC), a mobile terminal, a server, etc. The mobile terminal may be, for example, a vehicle-mounted device, a cellular phone, a tablet computer, a personal digital assistant, a wearable device, a smart speaker and other hardware devices with various operating systems, touchscreens and/or displays. In the following embodiments, the execution subject may be, for example, an electronic device.

As illustrated in FIG. 1, the method for generating a human face video includes the following.

At block 101, a mouth-shape multimedia resource and a reference human face image of a target object are obtained.

In embodiments of the disclosure, the mouth-shape multimedia resource is a mouth-shape multimedia resource of a non-target object or an integrated mouth-shape multimedia resource.

In an example, the mouth-shape multimedia resource is a mouth-shape multimedia resource of a non-target object. The non-target object is a different object from the target object. If the target object belongs to a certain group of objects, the non-target object may be an object, in the group of objects, other than the target object. The mouth-shape multimedia resource may be a mouth-shape multimedia resource of one non-target object, or a resource obtained by splicing the mouth-shape multimedia resources of a plurality of non-target objects.

In another example, the mouth-shape multimedia resource is the integrated mouth-shape multimedia resource, which may be an integrated mouth-shape multimedia resource for a certain character or a resource obtained by splicing the integrated mouth-shape multimedia resources of multiple characters. The above-mentioned "character" may be for example an animated character.

There are various ways to acquire mouth-shape multimedia resource, such that the electronic device may obtain the mouth-shape multimedia resource quickly and conveniently at a lower cost, which reduces the cost of obtaining the mouth-shape multimedia resource.

In embodiments of the disclosure, the mouth-shape multimedia resource may be a mouth shape audio or a mouth shape video. The mouth shape video may be a video without audio and containing speaking actions of an object. Or, the mouth shape video may be a video with audio containing speaking actions of an object. The mouth shape audio is an audio that corresponds to a series of speaking actions of an object. That is, part of audio frames in the audio are consistent with the speaking actions of the object, which are audio frames generated after the object performs the speaking actions.

The setting of the mouth shape audio or the mouth shape video facilitates the electronic device to select appropriate mouth-shape multimedia resource according to its needs, which further reduces the cost of obtaining mouth-shape multimedia resource.

At block 102, a reference style vector of the target object is obtained.

In an embodiment of the disclosure, the reference style vector of the target object may be determined in combination with any one of the human face images of the target object. The human face image may contain a region of a mouth shape image of the target object, from which the reference style vector that reflects a mouth shape style of the target object may be extracted. Correspondingly, the process in which the electronic device executes the block 102 may be, for example, inputting a human face image of the target object into a style vector extraction model, and obtaining the reference style vector outputted by the style vector extraction model. The human face image of the target object may be any human face image of the target object, or a reference human face image of the target object.

The style vector extraction model has been trained with positive sample pairs and negative sample pairs. The positive sample pair may include two human face images of the same object, and the negative sample pair may include two human face images of different objects.

At block 103, for each resource frame in the mouth-shape multimedia resource, a mouth-shape driving feature is obtained by performing a feature extraction process on the resource frame.

In embodiments of the disclosure, the process in which the electronic device executes the block 103 may be, for example, for each resource frame in the mouth-shape multimedia resource, inputting the resource frame into a feature extraction network contained in the human face and mouth shape driver model, and obtaining the mouth-shape driving feature outputted by the feature extraction network.

If the mouth-shape multimedia resource is the mouth shape audio, the resource frames may be audio frames. If the mouth-shape multimedia resource is the mouth shape video, the resource frames may be video frames.

At block 104, a stylistic human face image corresponding to the resource frame is generated based on the mouth-shape driving feature, the reference human face image, and the reference style vector.

In an embodiment of the disclosure, the process in which the electronic device executes the 104 may be, for example, inputting the mouth-shape driving feature, the reference human face image and the reference style vector into a human face driving network contained in the human face and mouth shape driver model, and obtaining the stylistic human face image outputted by the human face driving network.

In another example, the process in which the electronic device executes the block 104 may be, for example, determining a stylistic mouth-shape driving feature based on the mouth-shape driving feature and the reference style vector, and generating the stylistic human face image corresponding to the resource frame based on the stylistic mouth-shape driving feature and the reference human face image.

The stylistic mouth-shape driving feature may reflect the personal mouth shape style of the target object, which makes sure that the generated stylistic human face video may reflect the personal mouth shape style of the target object, thereby further improving the accuracy of the generated stylistic human face video.

At block 105, a stylistic human face video of the target object is determined based on each stylistic human face image corresponding to each resource frame in the mouth-shape multimedia resource.

In an embodiment of the disclosure, the process in which the electronic device executes the block 105 may be, for example, obtaining the stylistic human face image of the target object by sorting and combining each stylistic human face image in accordance with the ranking sequence of resource frames in the mouth-shape multimedia resource.

With the method for generating a human face video according to embodiments of the disclosure, the mouth-shape multimedia resource and the reference human face image of the target object are obtained. The reference style vector of the target object is obtained. For each resource frame in the mouth-shape multimedia resource, the mouth-shape driving feature is obtained by performing a feature extraction process on the resource frame. The stylistic human face image corresponding to the resource frame is generated based on the mouth-shape driving feature, the reference human face image and the reference style vector. The stylistic human face video of the target object is determined based on each stylistic human face image corresponding to each resource frame in the mouth-shape multimedia resource. Therefore, the reference style vector of the target object may reflect the personal mouth shape style of the target object, which makes sure that the generated stylistic human face video may reflect the personal mouth shape style of the target object, thereby further improving the accuracy of the generated stylistic human face video.

Figure 2:
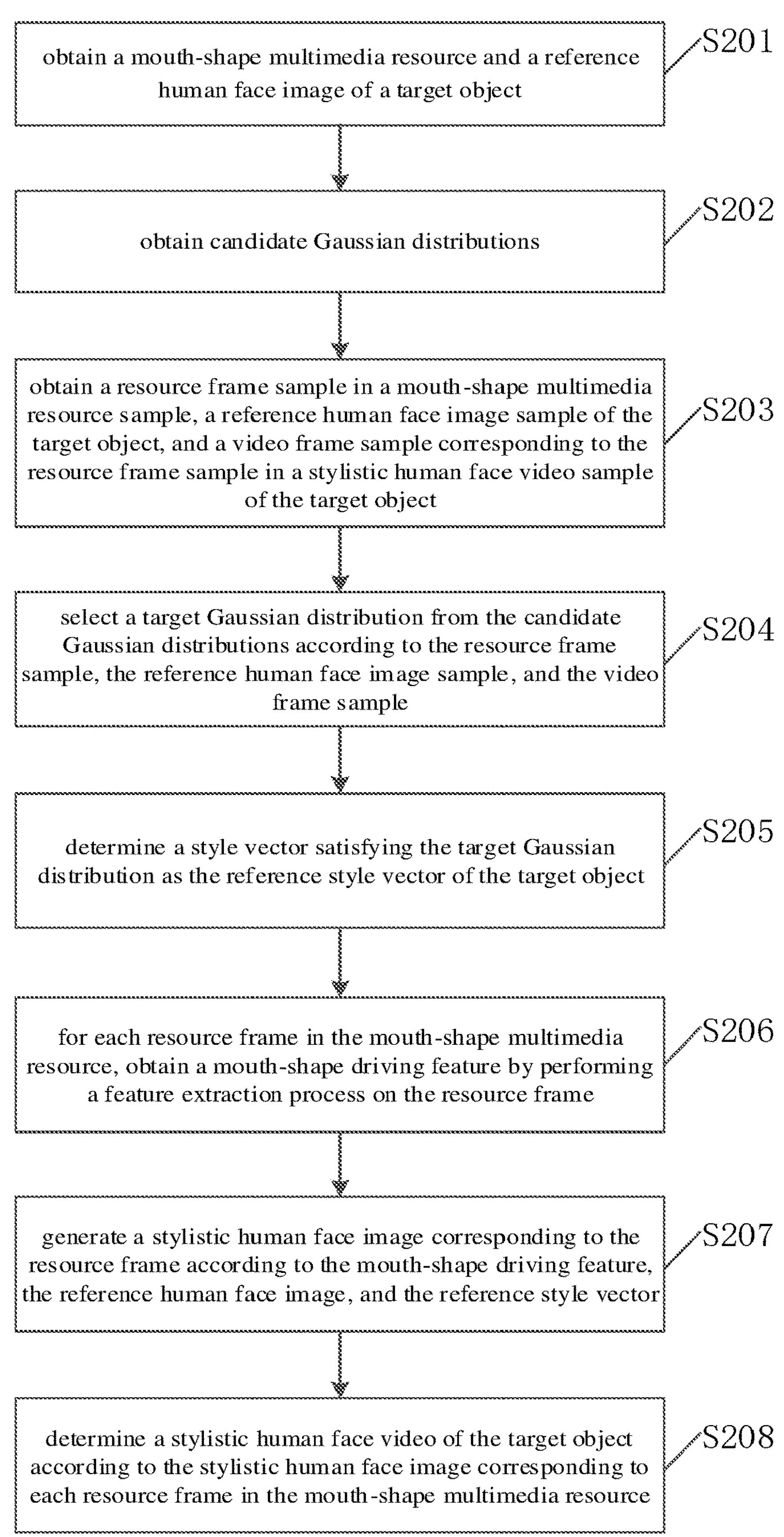
FIG. 2 is a schematic diagram according to a second embodiment of the disclosure.

The electronic device may select a target Gaussian distribution from various candidate Gaussian distributions based on a resource frame sample, a reference human face image sample and a video frame sample, and then take a style vector satisfying the target Gaussian distribution as the reference style vector of the target object. In this way, the electronic device may accurately and quickly obtain the reference style vector of the target object, which reduces the amount of data to be processed required by determining the reference style vector. As illustrated in FIG. 2, FIG. 2 is a schematic diagram according to a second embodiment of the disclosure. The embodiment illustrated in FIG. 2 may include the following.

At block 201, a mouth-shape multimedia resource and a reference human face image of a target object are obtained.

At block 202, candidate Gaussian distributions are obtained.

Different candidate Gaussian distributions have different mean values and/or variance values.

At block 203, a resource frame sample in a mouth-shape multimedia resource sample, a reference human face image sample of the target object, and a video frame sample, in a stylistic human face video sample of the target object, corresponding to the resource frame sample are obtained.

In embodiments of the disclosure, the mouth shape feature of the resource frame sample in the mouth-shape multimedia resource sample matches the mouth shape feature of the video frame sample in the stylistic human face video sample. Correspondingly, the process in which the electronic device executes the block 203 may include: obtaining a plurality of mouth-shape multimedia resources, and a plurality of stylistic human face videos of a target object; determining, for each mouth-shape multimedia resource, a respective first mouth shape feature for each resource frame in the mouth-shape multimedia resource; determining, for each stylistic human face video of the target object, a respective second mouth shape feature for each video frame in the stylistic human face video; obtaining a plurality of video combinations, in which each video combination includes one mouth-shape multimedia resource and one stylistic human face video of the target object; for each video combination, determining a mouth shape-feature matching degree between the mouth-shape multimedia resource and the stylistic human face video in the video combination based on the plurality of first mouth shape features of the mouth-shape multimedia resource and the plurality of second mouth shape features of the stylistic human face video in the video combination; in response to the mouth shape-feature matching degree meeting a preset matching degree condition, determining the mouth-shape multimedia resource in the video combination as the mouth-shape multimedia resource sample; and determining the stylistic human face video in the video combination as the stylistic human face video sample.

At block 204, a target Gaussian distribution is selected from the candidate Gaussian distributions based on the resource frame sample, the reference human face image sample and the video frame sample.

In embodiments of the disclosure, the process in which the electronic device performs the block 204 may include: determining a mouth-shape driving feature sample of the resource frame sample; determining candidate style vectors that respectively match the candidate Gaussian distributions sequentially; generating a stylistic human face prediction image based on the candidate style vector, the reference human face image sample and the mouth-shape driving feature sample; and in response to a similarity between the stylistic human face prediction image and the video frame sample satisfying a similarity condition, determining the candidate Gaussian distribution as the target Gaussian distribution.

The candidate style vector may include values in multiple dimensions. The candidate style vector that conforms to the candidate Gaussian distribution means that the values in multiple dimensions in the candidate style vector conform to a Gaussian distribution.

There are a smaller amount of candidate Gaussian distributions, and the candidate style vectors respectively conforming to the candidate Gaussian distributions are determined sequentially. The stylistic human face prediction image is generated based on the candidate style vector, the reference human face image sample, and the mouth shape driving feature sample. By selecting the target Gaussian distribution, the time required for acquiring the target Gaussian distribution may be shorten and the amount of data to be processed in determining the target Gaussian distribution may be reduced, thereby improving the accuracy of the selected target Gaussian distribution.

At block 205, a style vector that satisfies the target Gaussian distribution is determined as a reference style vector of the target object.

At block 206, for each resource frame in the mouth-shape multimedia resource, a mouth-shape driving feature is obtained by performing a feature extraction process on the resource frame.

At block 207, a stylistic human face image corresponding to the resource frame is generated based on the mouth-shape driving feature, the reference human face image, and the reference style vector.

At block 208, a stylistic human face video of the target object is determined based on the stylistic human face image corresponding to each resource frame in the mouth-shape multimedia resource.

It is noteworthy that the detailed description of the block 201 and blocks 206-208 may be referred to the detailed description of the block 101 and the blocks 103-105 in the embodiment of FIG. 1, which will not be described in detail here.

With the method for generating a human face video according to embodiments of the disclosure, the mouth-shape multimedia resource and the reference human face image of the target object are obtained. The candidate Gaussian distributions are obtained. The resource frame sample in the mouth-shape multimedia resource sample, the reference human face image sample of the target object, and the video frame sample corresponding to the resource frame sample in the stylistic human face video sample of the target object are obtained. The target Gaussian distribution is selected from the candidate Gaussian distributions based on the resource frame sample, the reference human face image sample, and the video frame sample. The style vector satisfying the target Gaussian distribution is determined as the reference style vector of the target object. For each resource frame in the mouth-shape multimedia resource, the mouth-shape driving feature is obtained by performing the feature extraction process on the resource frame. The stylistic human face image corresponding to the resource frame is generated based on the mouth-shape driving feature, the reference human face image, and the reference style vector. The stylistic human face video of the target object is determined based on the stylistic human face image corresponding to each resource frame in the mouth-shape multimedia resource. The setting of the reference style vector of the target object is configured, and the target Gaussian distribution is selected from the candidate Gaussian distributions based on the resource frame sample, the reference human face image sample and the video frame sample, and thus the reference style vector that conforms to the target Gaussian distribution may be obtained, to make sure that the generated stylistic human face video may reflect the personal mouth shape style of the target object, thereby further improving the accuracy of the generated stylistic human face video.

Figure 3:
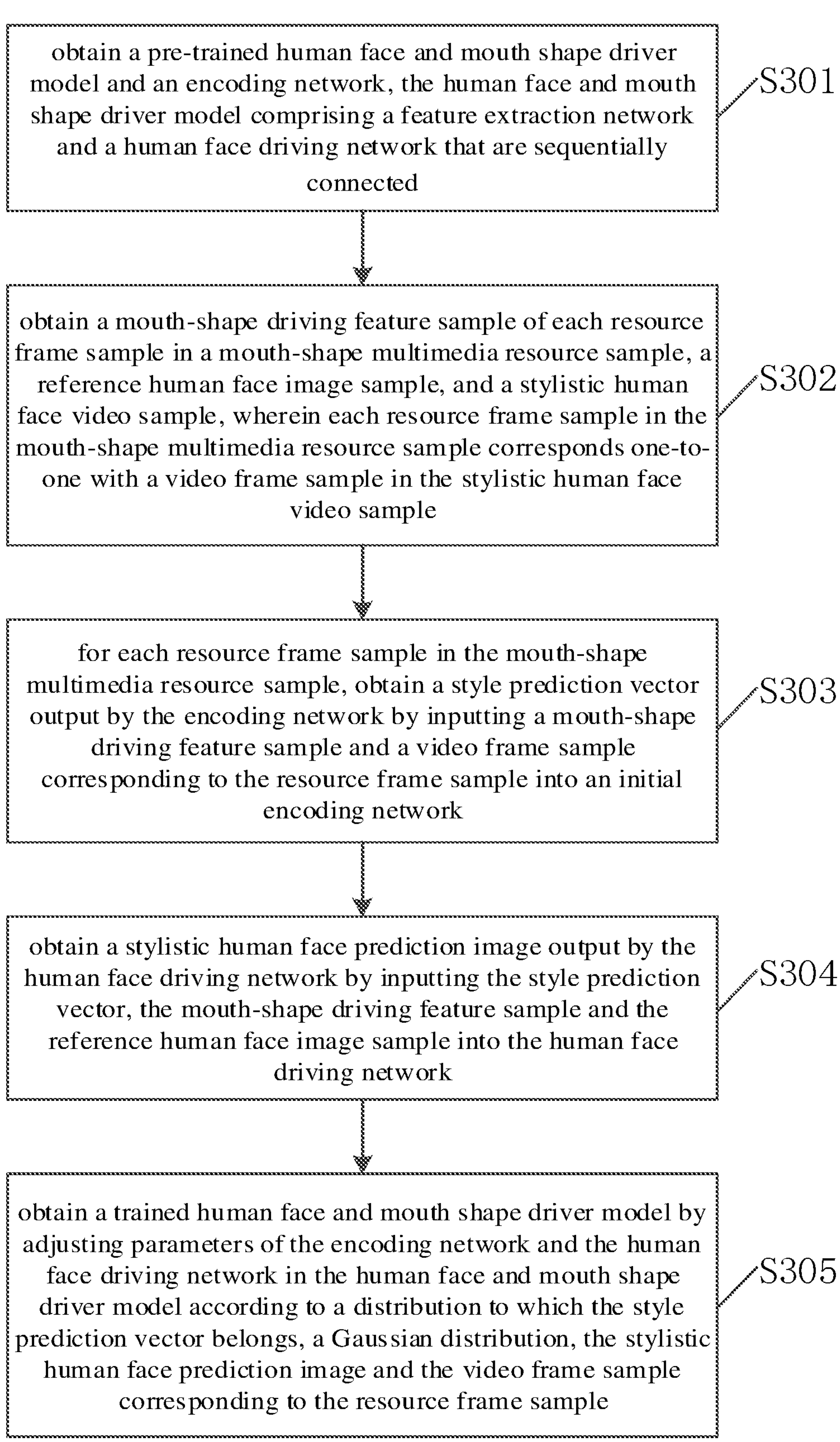
FIG. 3 is a schematic diagram according to a third embodiment of the disclosure.

FIG. 3 is a schematic diagram according to a third embodiment of the disclosure. It is noteworthy that a method for training a human face and mouth shape driver model according to embodiments of the disclosure may be performed by an apparatus for training a human face and mouth shape driver model. The apparatus may be provided in an electronic device, to cause the electronic device to perform a function of training a human face and mouth shape driver model.

The electronic device may be any device having computing capability, such as a PC, a mobile terminal, a server, etc. The mobile terminal may be, for example, a vehicle-mounted device, a cellular phone, a tablet computer, a personal digital assistant, a wearable device, a smart speaker and other hardware devices with various operating systems, touchscreens and/or displays. In the following embodiments, the execution subject may be, for example, an electronic device.

As illustrated in FIG. 3, the method for training a human face and mouth shape driver model includes the following.

At block 301, a pre-trained human face and mouth shape driver model and an encoding network are obtained, the human face and mouth shape driver model including a feature extraction network and a human face driving network that are sequentially connected.

In embodiments of the disclosure, the input of the encoding network may be connected to the output of the feature extraction network, and the output of the encoding network may be connected to the input of the human face driving network.

The encoding network may be, for example, an encoder in a Conditional Variational Autoencoder (CVAE). The CVAE may include one encoder and one decoder. The encoder is used for performing feature extraction on the input and convert the extracted features into a specific Gaussian distribution, from which a random vector is selected as the output. The decoder is used for performing a reverse convolution operation on the input to reconstruct a brain volume structural image from the potentially distributed features as the output.

At step 302, a respective mouth-shape driving feature sample of each resource frame sample in a mouth-shape multimedia resource sample, a reference human face image sample, and a stylistic human face video sample are obtained, in which each resource frame sample in the mouth-shape multimedia resource sample corresponds one-to-one with each video frame sample in the stylistic human face video sample.

In embodiments of the disclosure, the process in which the electronic device performs the block 302 may include: obtaining the mouth-shape multimedia resource sample, the reference human face image sample, and the stylistic human face video sample; for each resource frame sample in the mouth-shape multimedia resource sample, inputting the resource frame sample into the feature extraction network in a human face and mouth shape driver model, and obtaining the mouth shape driving feature sample of the resource frame sample outputted by the feature extraction network.

The mouth-shape multimedia resource sample may be one or more mouth shape multimedia resources of any one or more of objects. The stylistic human face video sample may be one or more stylistic human face videos of any one or more of objects. The object corresponding to the mouth-shape multimedia resource sample may be identical to or different from the object corresponding to the stylistic human face video sample. The number of objects corresponding to the mouth-shape multimedia resource sample may or may not be consistent with the number of objects corresponding to the stylistic human face video sample.

The feature extraction network in the human face and mouth shape driver model is used for performing feature extraction on the resource frame samples in the mouth-shape multimedia resource sample, which may improve the accuracy of the obtained mouth shape driving feature sample.

In embodiments of the disclosure, the electronic device acquires the mouth-shape multimedia resource sample, the reference human face image sample, and the stylistic human face video sample. The acquisition process includes: obtaining a human face video sample; using the human face video sample as a stylistic human face video sample; using the human face video sample or an audio in the human face video sample as a mouth-shape multimedia resource sample; and using any video frame in the human face video sample as a reference human face image sample.

Based on the human face video sample, the mouth-shape multimedia resource sample, the stylistic human face video sample, and the reference human face image sample are determined separately, which reduces the cost of obtaining the mouth-shape multimedia resource sample, the stylistic human face video sample, and the reference human face image sample, thereby improving the acquisition efficiency and improving the training speed of the human face and mouth shape driver model.

At block 303, for each resource frame sample in the mouth-shape multimedia resource sample, a style prediction vector outputted by the encoding network is obtained by inputting a mouth-shape driving feature sample and a video frame sample corresponding to the resource frame sample into an initial encoding network.

At block 304, a stylistic human face prediction image outputted by the human face driving network is obtained by inputting the style prediction vector, the mouth-shape driving feature sample and the reference human face image sample into the human face driving network.

At block 305, a trained human face and mouth shape driver model is obtained by adjusting parameters of the encoding network and the human face driving network in the human face and mouth shape driver model based on a distribution to which the style prediction vector belongs, a Gaussian distribution, the stylistic human face prediction image and the video frame sample corresponding to the resource frame sample.

In embodiments of the disclosure, the process in which the electronic device performs the block 305 may include: determining a value of a first sub-loss function based on the distribution to which the style prediction vector belongs, the Gaussian distribution, and the first sub-loss function; determining a value of a second sub-loss function based on the stylistic human face prediction image, a video frame sample corresponding to the resource frame sample, and the second sub-loss function; determining a value of a loss function based on the value of the first sub-loss function and the value of the second sub-loss function; and obtaining the trained human face and mouth shape driver model by adjusting the parameters of the encoding network and the human face driving network in the human face and mouth shape driver model based on the value of the loss function.

The distribution to which the style prediction vector belongs may be a probability distribution. The probability distribution may include at least one of: a binomial distribution, a multinomial distribution, a hyper-geometric distribution, a Poisson distribution, a normal distribution, an exponential distribution, a uniform distribution, and the like. The process of determining the distribution to which the style prediction vector belongs by the electronic device may include: determining at least one distribution assumption based on the style prediction vector; for each distribution assumption, determining distribution parameters under the distribution assumption and a degree of fit between the distribution assumption under the distribution parameters and the style prediction vector; selecting a target distribution assumption of the style prediction vector from the at least one distribution assumption based on the respective degree of fit for each distribution assumption; and determining the distribution to which the style prediction vector belongs based on the target distribution assumption and the distribution parameters under the target distribution assumption.

The first sub-loss function may be, for example, KL loss, which is used to measure a difference between two probability distributions. In combination with the calculation equation of the KL loss, the difference between the Gaussian distribution and the distribution to which the style prediction vector belongs may be determined.

The value of the first sub-loss function and the value of the second sub-loss function are determined in combination with the distribution to which the style prediction vector belongs, the Gaussian distribution, the stylistic human face prediction image, and the video frame sample corresponding to the resource frame sample. The parameters of the encoding network and the human face driving network are adjusted, so that the trained human face driving network may generate, in combination with the style vectors conforming to the Gaussian distribution, the stylistic human face video having a personal style, thereby improving the accuracy of the generated stylistic human face video.

With the method for training a human face and mouth shape driver model according to embodiments of the disclosure, the pre-trained human face and mouth shape driver model and the encoding network are obtained. The human face and mouth shape driver model includes a feature extraction network and a human face driving network that are sequentially connected. A respective mouth-shape driving feature sample of each resource frame sample in the mouth-shape multimedia resource sample, the reference human face image sample, and the stylistic human face video sample are obtained. Each resource frame sample in the mouth-shape multimedia resource sample corresponds one-to-one with each video frame sample in the stylistic human face video sample. For each resource frame sample in the mouth-shape multimedia resource sample, the style prediction vector outputted by the encoding network is obtained by inputting the mouth-shape driving feature sample and the video frame sample corresponding to the resource frame sample into an initial encoding network. The stylistic human face prediction image outputted by the human face driving network is obtained by inputting the style prediction vector, the mouth-shape driving feature sample and the reference human face image sample into the human face driving network. The trained human face and mouth shape driver model is obtained by adjusting parameters of the encoding network and the human face driving network in the human face and mouth shape driver model based on the distribution to which the style prediction vector belongs, the Gaussian distribution, the stylistic human face prediction image and the video frame sample corresponding to the resource frame sample. When generating the stylistic human face video, the trained human face driving network may generate the stylistic human face video having the personal style in combination with the style vectors conforming to the Gaussian distribution, which further improves the accuracy of the generated stylistic human face video.

Figure 4:
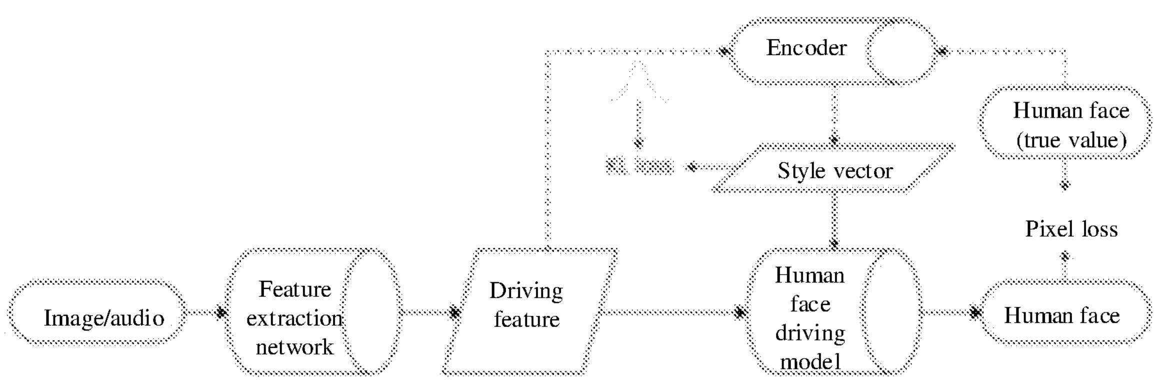
FIG. 4 is a schematic diagram of training a human face and mouth shape driver model.

An example is given below for illustration. As illustrated in FIG. 4, FIG. 4 is a schematic diagram of training a human face and mouth shape driver model. In FIG. 4, (1) image/audio frames (resource frame samples in the mouth-shape multimedia resource sample) are input into the feature extraction network in the human face and mouth shape driver model to obtain the driving features (mouth shape driving feature samples) outputted by the feature extraction network. (2) The driving features and the human face image (the Ground Truth) are input into the encoder (encoding network) to obtain the style vectors (style prediction vector) outputted by the encoder. The human face image (the Ground Truth) is a video frame sample corresponding to the resource frame sample. (3) The driving features and the style vectors are input into the human face driving network in the human face and mouth shape driver model, and the human face image (stylistic human face prediction image) outputted by the human face driving network is obtained. (4) The KL loss (the value of the first sub-loss function) is obtained in combination with the Gaussian distribution and the style vectors. The pixel loss (the value of the second sub-loss function) is obtained in combination with the human face image outputted by the human face driving network and the human face image (the Ground Truth). The encoder and the human face driving network are trained to obtain the trained human face and mouth shape driver model.

Figure 5:
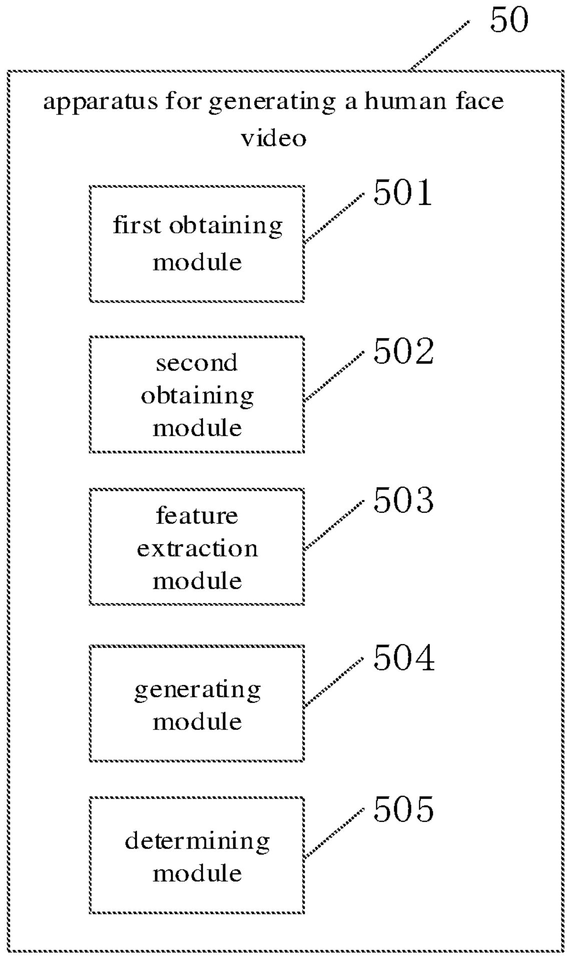
FIG. 5 is a schematic diagram according to a fourth embodiment of the disclosure.

In order to realize the above embodiments, the disclosure also provides an apparatus for generating a human face video. As illustrated in FIG. 5, FIG. 5 is a schematic diagram according to a fourth embodiment of the disclosure. The apparatus 50 for generating a human face video includes: a first obtaining module 501, a second obtaining module 502, a feature extraction module 503, a generating module 504, and a determining module 505.

The first obtaining module 501 is configured to obtain a mouth-shape multimedia resource and a reference human face image of a target object. The second obtaining module 502 is configured to obtain a reference style vector of the target object. The feature extraction module 503 is configured to, for each resource frame in the mouth-shape multimedia resource, obtain a mouth-shape driving feature by performing a feature extraction process on the resource frame. The generating module 504 is configured to generate a stylistic human face image corresponding to the resource frame based on the mouth-shape driving feature, the reference human face image, and the reference style vector. The determining module 505 is configured to determine a stylistic human face video of the target object based on each stylistic human face image corresponding to each resource frame in the mouth-shape multimedia resource.

As a possible implementation of embodiments of the disclosure, the reference style vector conforms to a Gaussian distribution, and the second obtaining module 502 includes: a first obtaining unit, a second obtaining unit, a selecting unit, and a determining unit. The first obtaining unit is configured to obtain candidate Gaussian distributions. The second obtaining unit is configured to obtain a resource frame sample in a mouth-shape multimedia resource sample, a reference human face image sample of the target object, and a video frame sample, in a stylistic human face video sample of the target object, corresponding to the resource frame sample. The selecting unit is configured to select a target Gaussian distribution from the candidate Gaussian distributions based on the resource frame sample, the reference human face image sample, and the video frame sample. The determining unit is configured to determine a style vector satisfying the target Gaussian distribution as the reference style vector of the target object.

As a possible implementation of embodiments of the disclosure, the selecting unit is configured to: determine a mouth-shape driving feature sample of the resource frame sample; determine a respective candidate style vector matching each of the candidate Gaussian distributions sequentially; generate a stylistic human face prediction image based on the candidate style vector, the reference human face image sample, and the mouth-shape driving feature sample; and in response to a similarity between the stylistic human face prediction image and the video frame sample satisfying a similarity condition, determine the candidate Gaussian distribution as the target Gaussian distribution.

As a possible implementation of embodiments of the disclosure, the generating module 504 is configured to: determine a mouth-shape style driving feature based on the mouth-shape driving feature and the reference style vector; and generate the stylistic human face image corresponding to the resource frame based on the mouth-shape style driving feature and the reference human face image.

As a possible implementation of embodiments of the disclosure, the mouth-shape multimedia resource is a mouth-shape audio or a mouth-shape video.

As a possible implementation of embodiments of the disclosure, the mouth-shape multimedia resource is a mouth-shape multimedia resource of a non-target object or an integrated mouth-shape multimedia resource.

With the apparatus for generating a human face video according to embodiments of the disclosure, the mouth-shape multimedia resource and the reference human face image of the target object are obtained. The reference style vector of the target object is obtained. For each resource frame in the mouth-shape multimedia resource, the mouth-shape driving feature is obtained by performing the feature extraction process on the resource frame. The stylistic human face image corresponding to the resource frame is generated based on the mouth-shape driving feature, the reference human face image, and the reference style vector. The stylistic human face video of the target object is determined based on the stylistic human face image corresponding to each resource frame in the mouth-shape multimedia resource. The reference style vector of the target object may reflect the personal mouth shape style of the target object, and make sure that the generated stylistic human face video may reflect the personal mouth shape style of the target object, which further improves the accuracy of the generated stylistic human face video.

Figure 6:
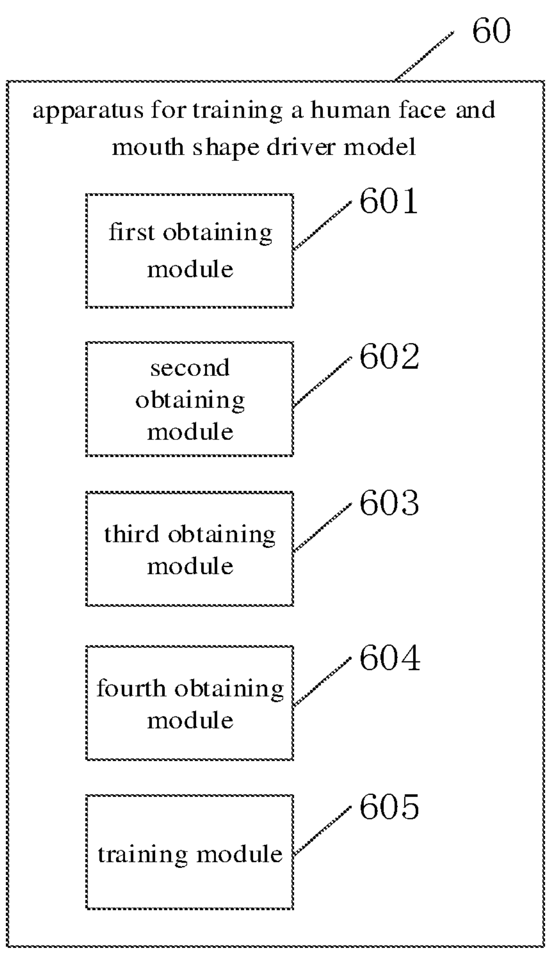
FIG. 6 is a schematic diagram according to a fifth embodiment of the disclosure.

In order to realize the above embodiments, the disclosure also provides an apparatus for training a human face and mouth shape driver model. As illustrated in FIG. 6, FIG. 6 is a schematic diagram according to a fifth embodiment of the disclosure. The apparatus 60 for training a human face and mouth shape driver model includes: a first obtaining module 601, a second obtaining module 602, a third obtaining module 603, a fourth obtaining module 604, and a training module 605.

The first obtaining module 601 is configured to obtain a pre-trained human face and mouth shape driver model and an encoding network, in which the human face and mouth shape driver model includes a feature extraction network and a human face driving network that are sequentially connected. The second obtaining module 602 is configured to obtain a respective mouth-shape driving feature sample of each resource frame sample in a mouth-shape multimedia resource sample, a reference human face image sample, and a stylistic human face video sample, in which each resource frame sample in the mouth-shape multimedia resource sample corresponds one-to-one with each video frame sample in the stylistic human face video sample. The third obtaining module 603 is configured to, for each resource frame sample in the mouth-shape multimedia resource sample, obtain a style prediction vector outputted by the encoding network by inputting a mouth-shape driving feature sample and a video frame sample corresponding to the resource frame sample into an initial encoding network. The fourth obtaining module 604 is configured to obtain a stylistic human face prediction image outputted by the human face driving network by inputting the style prediction vector, the mouth-shape driving feature sample and the reference human face image sample into the human face driving network. The training module 605 is configured to obtain a trained human face and mouth shape driver model by adjusting parameters of the encoding network and the human face driving network in the human face and mouth shape driver model based on a distribution to which the style prediction vector belongs, a Gaussian distribution, the stylistic human face prediction image and the video frame sample corresponding to the resource frame sample.

As a possible implementation of embodiments of the disclosure, the second obtaining module 602 includes: a first obtaining unit and a second obtaining unit. The first obtaining unit is configured to obtain the mouth-shape multimedia resource sample, the reference human face image sample, and the stylistic human face video sample. The second obtaining unit is configured to, for each resource frame sample in the mouth-shape multimedia resource sample, obtain the mouth-shape driving feature sample of the resource frame sample outputted by the feature extraction network by inputting the resource frame sample into the feature extraction network in the human face and mouth shape driver model.

As a possible implementation of embodiments of the disclosure, the first obtaining unit is configured to: obtain a human face video sample; determine the human face video sample as the stylistic human face video sample; determine the human face video sample or an audio in the human face video sample as the mouth-shape multimedia resource sample; and determine any one of video frames from the human face video sample as the reference human face image sample.

As a possible implementation of embodiments of the disclosure, the training module 605 is configured to: determine a value of a first sub-loss function based on the distribution to which the style prediction vector belongs, the Gaussian distribution, and the first sub-loss function; determine a value of a second sub-loss function based on the stylistic human face prediction image, a video frame sample corresponding to the resource frame sample, and the second sub-loss function; determine a value of a loss function based on the value of the first sub-loss function and the value of the second sub-loss function; and obtain the trained human face and mouth shape driver model by adjusting the parameters of the encoding network and the human face driving network in the human face and mouth shape driver model based on the value of the loss function.

With the apparatus for training a human face and mouth shape driver model according to embodiments of the disclosure, the pre-trained human face and mouth shape driver model and the encoding network are obtained. The human face and mouth shape driver model includes the feature extraction network and the human face driving network that are sequentially connected. The mouth-shape driving feature sample of each resource frame sample in the mouth-shape multimedia resource sample, the reference human face image sample, and the stylistic human face video sample are obtained. Each resource frame sample in the mouth-shape multimedia resource sample corresponds one-to-one with each video frame sample in the stylistic human face video sample. For each resource frame sample in the mouth-shape multimedia resource sample, the style prediction vector outputted by the encoding network is obtained by inputting the mouth-shape driving feature sample and the video frame sample corresponding to the resource frame sample into an initial encoding network. The stylistic human face prediction image outputted by the human face driving network is obtained by inputting the style prediction vector, the mouth-shape driving feature sample and the reference human face image sample into the human face driving network. The trained human face and mouth shape driver model is obtained by adjusting parameters of the encoding network and the human face driving network in the human face and mouth shape driver model based on the distribution to which the style prediction vector belongs, the Gaussian distribution, the stylistic human face prediction image and the video frame sample corresponding to the resource frame sample. When generating the stylistic human face video, the trained human face driving network may generate the stylistic human face video having the personal style in combination with the style vectors conforming to the Gaussian distribution, which further improves the accuracy of the generated stylistic human face video.

The collection, storage, use, processing, transmission, provision and disclosure of the user's personal information involved in the technical solutions of the disclosure are all carried out with the user's consent, and are all in compliance with relevant laws and regulations and do not violate public order and morality.

According to the embodiments of the disclosure, the disclosure also provides an electronic device, a readable storage medium and a computer program product.

Figure 7:
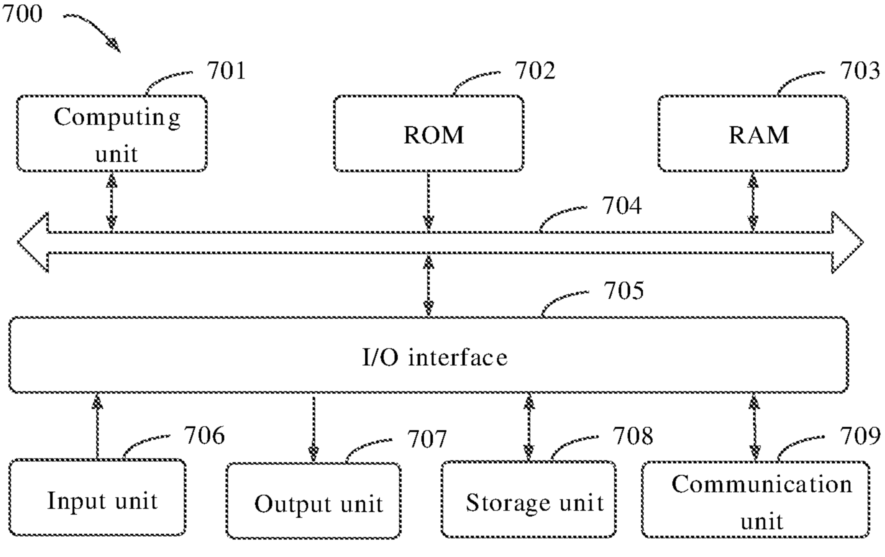
FIG. 7 is a block diagram of an electronic device used to implement a method for generating a human face video or a method for training a human face and mouth shape driver model according to an embodiment of the disclosure.

FIG. 7 is a block diagram of an electronic device 700 for implementing the embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 7, the electronic device 700 includes: one or more processors 1401, a memory 1402, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 1401 is taken as an example in FIG. 14.

As illustrated in FIG. 7, the electronic device 700 includes a computing unit 701 for performing various appropriate actions and processes based on computer programs stored in a Read-Only Memory (ROM) 702 or computer programs loaded from the storage unit 708 to a Random Access Memory (RAM) 703. In the RAM 703, various programs and data required for the operation of the device 700 are stored. The computing unit 701, the ROM 702, and the RAM 703 are connected to each other through a bus 704. An input/output (I/O) interface 705 is also connected to the bus 704.

Components in the device 700 are connected to the I/O interface 705, including: an inputting unit 706, such as a keyboard, a mouse; an outputting unit 707, such as various types of displays, speakers; a storage unit 708, such as a disk, an optical disk; and a communication unit 709, such as network cards, modems, and wireless communication transceivers. The communication unit 709 allows the device 700 to exchange information/data with other devices through a computer network such as the Internet and/or various telecommunication networks.

The computing unit 701 may be various general-purpose and/or dedicated processing components with processing and computing capabilities. Some examples of computing unit 701 include, but are not limited to, a Central Processing Unit (CPU), a Graphics Processing Unit (GPU), various dedicated AI computing chips, various computing units that run machine learning model algorithms, and a Digital Signal Processor (DSP), and any appropriate processor, controller and microcontroller. The computing unit 701 executes the various methods and processes described above, such as the method for generating a human face video or the method for training a human face and mouth shape driver model. For example, in some embodiments, the method for generating a human face video or the method for training a human face and mouth shape driver model may be implemented as a computer software program, which is tangibly contained in a machine-readable medium, such as the storage unit 708. In some embodiments, part or all of the computer program may be loaded and/or installed on the device 700 via the ROM 702 and/or the communication unit 709. When the computer program is loaded on the RAM 703 and executed by the computing unit 701, one or more steps of the method for generating a human face video or the method for training a human face and mouth shape driver model described above may be executed. Alternatively, in other embodiments, the computing unit 701 may be configured to perform the method for generating a human face video or the method for training a human face and mouth shape driver model in any other suitable manner (for example, by means of firmware).

Various implementations of the systems and techniques described above may be implemented by a digital electronic circuit system, an integrated circuit system, a Field Programmable Gate Array (FPGA), an Application Specific Integrated Circuit (ASIC), an Application Specific Standard Product (ASSP), a System on Chip (SOC), a Complex Programmable Logic Device (CPLD), a computer hardware, a firmware, a software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in combination with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage medium include electrical connections based on one or more wires, portable computer disks, hard disks, RAMs, ROMs, Electrically Programmable Read-Only-Memories (EPROM), flash memories, fiber optics, Compact Disc Read-Only Memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: Local Area Network (LAN), Wide Area Network (WAN), and the Internet.

The computer system may include a client and a server. The client and server are generally remote from each other and interacting through a communication network. The client-server relation is generated by computer programs running on the respective computers and having a client-server relation with each other. The server may be a cloud server, a server of distributed system or a server combined with block-chain.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of the disclosure shall be included in the protection scope of the disclosure.

What is claimed is:

1. A method for generating a human face video, comprising:

obtaining a mouth-shape multimedia resource and a reference human face image of a target object;

obtaining a reference style vector of the target object;

for each resource frame in the mouth-shape multimedia resource, obtaining a respective mouth-shape driving feature by performing a feature extraction process on each resource frame;

generating a respective stylistic human face image corresponding to each resource frame based on the respective mouth-shape driving feature, the reference human face image and the reference style vector; and determining a stylistic human face video of the target object based on the respective stylistic human face image corresponding to each resource frame in the mouth-shape multimedia resource, wherein obtaining the reference style vector of the target object comprises:

determining respective similarities between respective stylistic human face prediction images generated from respective candidate style vectors conforming to candidate Gaussian distributions and a video frame sample from a stylistic human face video sample of the target object, and determining a candidate style vector whose similarity meets a similarity condition as the reference style vector.

2. The method of claim 1, further comprising:

obtaining the candidate Gaussian distributions to determine the respective candidate style vectors;

obtaining a resource frame sample in a mouth-shape multimedia resource sample to determine a mouth-shape driving feature sample of the resource frame sample, obtaining a reference human face image sample of the target object, and the video frame sample corresponding to the resource frame sample from the stylistic human face video sample of the target object; and generating respective stylistic human face prediction images based on the respective candidate style vectors, the reference human face image sample, and the mouth-shape driving feature sample.

3. The method of claim 1, wherein generating the stylistic human face image corresponding to the resource frame based on the mouth-shape driving feature, the reference human face image and the reference style vector, comprises:

determining a mouth-shape style driving feature based on the mouth-shape driving feature and the reference style vector; and generating the stylistic human face image corresponding to the resource frame based on the mouth-shape style driving feature and the reference human face image.

4. The method of claim 1, wherein the mouth-shape multimedia resource is a mouth-shape audio or a mouth-shape video.

5. The method of claim 1, wherein the mouth-shape multimedia resource is a mouth-shape multimedia resource of a non-target object or an integrated mouth-shape multimedia resource.

6. A non-transitory computer-readable storage medium having computer instructions stored thereon, wherein the computer instructions are used to cause a computer to perform the method of claim 1.

7. A method for training a human face and mouth shape driver model, comprising:

obtaining a pre-trained human face and mouth shape driver model and an encoding network, the human face and mouth shape driver model comprising a feature extraction network and a human face driving network that are sequentially connected;

obtaining a respective mouth-shape driving feature sample of each resource frame sample in a mouth-shape multimedia resource sample, a reference human face image sample, and a stylistic human face video sample, wherein each resource frame sample in the mouth-shape multimedia resource sample corresponds one-to-one with each video frame sample in the stylistic human face video sample;

for each resource frame sample in the mouth-shape multimedia resource sample, obtaining a style prediction vector outputted by the encoding network by inputting the mouth-shape driving feature sample and the video frame sample corresponding to the resource frame sample into an initial encoding network;

obtaining a stylistic human face prediction image outputted by the human face driving network by inputting the style prediction vector, the mouth-shape driving feature sample and the reference human face image sample into the human face driving network; and obtaining a trained human face and mouth shape driver model by adjusting parameters of the encoding network and the human face driving network in the human face and mouth shape driver model based on a distribution to which the style prediction vector belongs, a Gaussian distribution, the stylistic human face prediction image and the video frame sample corresponding to the resource frame sample;

wherein obtaining the trained human face and mouth shape driver model comprises:

determining a value of a first sub-loss function between the distribution to which the style prediction vector belongs and the Gaussian distribution;

determining a value of a second sub-loss function between the stylistic human face prediction image and a video frame sample corresponding to the resource frame sample;

determining a value of a loss function based on the value of the first sub-loss function and the value of the second sub-loss function; and obtaining the trained human face and mouth shape driver model by adjusting the parameters of the encoding network and the human face driving network in the human face and mouth shape driver model based on the value of the loss function.

8. The method of claim 7, wherein obtaining the respective mouth-shape driving feature sample of each resource frame sample in the mouth-shape multimedia resource sample, the reference human face image sample, and the stylistic human face video sample comprises:

obtaining the mouth-shape multimedia resource sample, the reference human face image sample, and the stylistic human face video sample; and for each resource frame sample in the mouth-shape multimedia resource sample, obtaining the mouth- shape driving feature sample of the resource frame sample outputted by the feature extraction network by inputting the resource frame sample into the feature extraction network in the human face and mouth shape driver model.

9. The method of claim 8, wherein obtaining the mouth-shape multimedia resource sample, the reference human face image sample and the stylistic human face video sample comprises:

obtaining a human face video sample;

determining the human face video sample as the stylistic human face video sample;

determining the human face video sample or an audio in the human face video sample as the mouth- shape multimedia resource sample; and determining any one of video frames from the human face video sample as the reference human face image sample.

10. An electronic device, comprising:

at least one processor; and a memory, communicatively coupled to the at least one processor;

wherein the memory stores instructions executable by the at least one processor, and when the instructions are executed by the at least one processor, the at least one processor is configured to perform the method of claim 7.

11. A non-transitory computer-readable storage medium having computer instructions, wherein the computer instructions are used to cause a computer to perform the method of claim 7.

12. An electronic device, comprising:

at least one processor; and a memory, communicatively coupled to the at least one processor;

wherein the memory stores instructions executable by the at least one processor, and when the instructions are executed by the at least one processor, the at least one processor is configured to:

obtain a mouth-shape multimedia resource and a reference human face image of a target object;

determine respective similarities between respective stylistic human face prediction images generated from respective candidate style vectors conforming to candidate Gaussian distributions and a video frame sample from a stylistic human face video sample of the target object, determine a candidate style vector whose similarity meeting a similarity condition as a reference style vector of the target object;

for each resource frame in the mouth-shape multimedia resource, obtain a respective mouth-shape driving feature by performing a feature extraction process on each resource frame;

generate a respective stylistic human face image corresponding to each resource frame based on the mouth-shape driving feature, the reference human face image and the reference style vector; and determine a stylistic human face video of the target object based on the stylistic human face image corresponding to each resource frame in the mouth-shape multimedia resource.

13. The electronic device of claim 12, wherein the at least one processor is configured to:

obtain the candidate Gaussian distributions to determine the respective candidate style vectors;

obtain a resource frame sample in a mouth-shape multimedia resource sample to determine a mouth-shape driving feature sample of the resource frame sample, obtain a reference human face image sample of the target object, and the video frame sample corresponding to the resource frame sample from the stylistic human face video sample of the target object; and generate respective stylistic human face prediction images based on the respective candidate style vectors, the reference human face image sample, and the mouth-shape driving feature sample.

14. The electronic device apparatus of claim 12, wherein the at least one processor is configured to:

determine a mouth-shape style driving feature based on the mouth-shape driving feature and the reference style vector; and generate the stylistic human face image corresponding to the resource frame based on the mouth- shape style driving feature and the reference human face image.

15. The electronic device of claim 12, wherein the mouth-shape multimedia resource is a mouth-shape audio or a mouth-shape video.

16. The electronic device of claim 12, wherein the mouth-shape multimedia resource is a mouth-shape multimedia resource of a non-target object or an integrated mouth-shape multimedia resource.

* * * * *